United States Patent [19]
Tojo et al.

[11] Patent Number: 5,004,787
[45] Date of Patent: Apr. 2, 1991

[54] VULCANIZABLE RUBBER COMPOSITION WITH TRIAZINE THIOLS

[75] Inventors: Tetsuo Tojo, Chiba; Keiji Okada, Ichihara; Takashi Nakahara; Yoshiharu Kikuchi, both of Ichihara, all of Japan

[73] Assignee: Mitsui Petrochemical Industries, Ltd., Tokyo, Japan

[21] Appl. No.: 195,908

[22] Filed: May 19, 1988

[30] Foreign Application Priority Data

May 22, 1987 [JP] Japan ................................. 62-123665

[51] Int. Cl.⁵ ............................................. C08C 19/22
[52] U.S. Cl. ................................ 525/332.1; 525/333.9; 525/334.1; 525/349; 525/403
[58] Field of Search ............... 525/332.1, 333.9, 334.1, 525/349, 403

[56] References Cited

U.S. PATENT DOCUMENTS

| | | | |
|---|---|---|---|
| 3,104,235 | 9/1963 | Kuntz | 525/375 |
| 4,173,694 | 4/1979 | Inagami | 525/351 |
| 4,569,958 | 2/1986 | Maeda | 524/100 |

FOREIGN PATENT DOCUMENTS 0175063 3/1986 European Pat. Off. .
0221313 5/1987 European Pat. Off. .

Primary Examiner—Christopher Henderson
Attorney, Agent, or Firm—Nixon & Vanderhye

[57] ABSTRACT

A vulcanizable rubber composition containing (i) (A) a chlorine-containing rubber and (B) a triazinethiol.amine salt or (ii) (a) a chlorine-containing rubber, (b) a triazinethiol as a vulcanization agent, and (c), as a vulcanization agent, (c-1) an aromatic carboxylic acid amine salt, (c-2) an aliphatic carboxylic acid amine salt, and (c-3) a phenolamine salt.

15 Claims, 5 Drawing Sheets

VULCANIZABLE RUBBER COMPOSITION WITH TRIAZINE THIOLS

BACKGROUND OF THE INVENTION

1. Field of the Invention

The present invention relates to a vulcanizable rubber composition of a chlorine-containing rubber such as chlorinated ethylene-α-olefin copolymer rubber, epichlorohydrin rubber, chlorinated polyethylene.

2. Description of the Related Art

Chlorine-containing rubbers are generally vulcanized and widely used in, for example, automobile parts, electrical parts, construction materials, and general industrial parts.

It is known in the art that the vulcanization of such chlorine-containing rubbers can be conducted by using a triazine derivative as the vulcanization agent (Japanese Pat. Publication (Kokoku) No. 48-36926 and 53-10099). Nevertheless, when a triazine derivative is formulated as the vulcanization agent according to the recipe known in the art, a drawback of storage stability arises wherein a lowering of, for example, the vulcanization rate, occurs and thus a problem arises in that the preparation of rubber products becomes difficult.

SUMMARY OF THE INVENTION

Accordingly, the objects of the present invention are to eliminate the above-mentioned problems of the prior art and to provide a vulcanizable composition of a chlorine-containing rubber, capable of providing a vulcanized product having excellent properties such as strength, heat-resistance, and aging, having an excellent storage stability and free from problems such as a lowering of the vulcanizability.

Other objects and advantages of the present invention will be apparent from the following description.

In accordance with the present invention, there is provided a vulcanizable rubber composition comprising:

(a) a chlorine-containing rubber; and
(b) as a vulcanization agent, a triazinethiol amine salt having the formula:

(I)

wherein n is a number of 1 to 3;

$R_1$ represents $-NR_4R_5$, $-OR_4$ or $-SR_4$, where $R_4$ and $R_5$ independently represent a hydrogen atom, an unsubstituted or substituted alkyl group, preferably having 1 to 20 carbon atoms or an unsubstituted or substituted aryl group, preferably having 6 to 20 carbon atoms, $R_2$ and $R_3$ independently represent a hydrogen atom, an unsubstituted or substituted alkyl group, preferably having 1 to 20 carbon atoms or an unsubstituted or substituted aryl group, preferably having 6 to 20 carbon atoms, and further, $R_2$ and $R_3$ may be bonded to each other to form a ring.

In accordance with the present invention, there is also provided a vulcanizable rubber composition comprising:

(a) a chlorine-containing rubber;
(b) as a vulcanization agent, a triazinethiol having the formula:

(II)

wherein $R_1$ is defined above; and (c) as a vulcanization aid, at least one selected from the group consisting of:

(c-1) aromatic carboxylic acid amine salts having the formula:

(III)

wherein m is a number of 1 to 3, p is a number of 1 to 3; m>p;

$R_6$ represents a hydrogen atom, an alkyl group, preferably having 1 to 20 carbon atoms, a halogen, a nitro group, a cyano group or a hydroxy group;

$R_7$ and $R_8$ each represent a hydrogen atom, an unsubstituted or substituted alkyl or cycloalkyl group, preferably having 1 to 20 carbon atoms, or an unsubstituted or substituted aryl group, preferably having 6 to 20 carbon atoms, and $R_7$ and $R_8$ may be bonded to each other to form a ring, (c-2) aliphatic carboxylic acid amine salts having the formula:

(IV)

wherein m, p, $R_7$, and $R_8$ are as defined above;

$R_9$ represents an unsubstituted or substituted monovalent to trivalent hydrocarbon group or direct bond, and (c-3) phenolamine salts having the formula:

(V)

wherein $R_6$, $R_7$ and $R_8$ are as described above, and q represents a number of 1 or 2.

BRIEF DESCRIPTION OF THE DRAWINGS

The present invention will be better understood from the description set forth below with reference to the accompanying drawings, in which.

Among these curves, the vulcanization curves A are those obtained at a temperature of 160° C. after the rubber compositions were allowed to stand at a room temperature for one hour, and the vulcanization curves B are those obtained at a temperature of 40° C. for 96 hours, followed by allowing to stand at room temperature for one hour.

DESCRIPTION OF THE PREFERRED EMBODIMENTS

According to the first aspect of the present invention, as a vulcanization agent, a triazine in the form of an amine salt having the above formula (I) is used, and according to the second aspect of the present invention, an aromatic or aliphatic carboxylic acid amine salt having the above formulae (III) to (IV) or a phenolamine salt (V) as a vulcanization aid, together with a triazine having the above formula (II) as a vulcanization agent for a chlorine-containing rubber is used.

In the first aspect of the present invention, since the triazine compound is formulated in the form of a stable amine salt, the storage stability of the rubber composition becomes excellent and the above-mentioned problem, i.e., the decrease in vulcanizability after a long period of storage, does not arise. Furthermore, since the amine salts are stable powder particles, the handling thereof is advantageously very easy in the formulation step. Furthermore, depending upon the applications thereof, the vulcanization can be widely varied by selecting the types of amines to be combined with the triazine compound.

In the second aspect of the present invention, by using a triazine and a specific vulcanization aid in combination, a lowering of the vulcanization rate can be effectively inhibited, and the storage stability of the rubber composition can be properly maintained, as shown in the Examples described below.

The reason why the lowering of the vulcanization rate is thus inhibited and the storage stability of the rubber composition is properly maintained is not yet clear, but it may be considered that, in the combination of a triazine and a vulcanization aid as described above, both exist in a stable state in the rubber composition, and thus can act effectively as the vulcanization agent and the vulcanization aid, respectively.

Since the amine salt to be used as the vulcanization aid in the present invention is a stable powder, another advantage is gained in that the handling in the formulation step is very easy.

Further, according to the present invention, by using a vulcanization aid obtained by selecting the kind of the amine to be combined with the carboxylic acid or phenol in accordance with the use, etc., thereof, the vulcanization rate can be varied over a wide range.

Chlorine-Containing Rubber (a)

In the present invention, all chlorine-containing rubbers known per se can be used, but particularly, chlorinated ethylene-α-olefin copolymer rubber, epichlohydrin rubber and chlorinated polyethylene are preferably used.

(i) Chlorinated ethylene-α-olefin copolymer rubber:

As such a chlorine-containing rubber, those containing α-olefin having 3 to 10 carbon atoms, a chlorine content of 5 to 45% by weight, preferably 15 to 40% by weight, most preferably 20 to 35% by weight, and a Mooney viscosity $ML_{1+4}$ (121° C.) in the range of 10 to 160, preferably 15 to 130, most preferably 20 to 100, are employed.

Further, the ethylene-α-olefin copolymer rubber before chlorination also may contain a non-conjugated polyene component of 10 or less as represented by the iodine value.

(ii) Epichlorohydrin rubber:

As the epichlorohydrin rubber, homopolymers of epichlorohydrin and copolymers of epichlorohydrin and ethylene oxide, epichlorohydrin-propylene oxide copolymers, epichlorohydrin-ethylene oxide-propylene oxide copolymers, and those having allyl glycidyl ether copolymerized with these homopolymers or copolymers, are included.

The chlorine content is generally in the range of 15 to 40% by weight.

In the present invention, it is particularly preferable that a rubber having a Mooney viscosity of $ML_{1+4}$ (100° C.) in the range of 20 to 150 is used, from the standpoints of moldability and processability, etc.

(iii) Chlorinated polyethylene:

The chlorinated polyethylene has a chlorine content of 20 to 50% by weight, and a specific gravity in the range of 1.05 to 1.30. The chlorinated polyethylene may also containing sulfur as the chlorosulfonyl group in an amount within 1.5% by weight.

Vulcanization Agent (b)

In the first aspect of the present invention, the triazinethiol.amine salts having the above formula (I) are employed. Typical examples of the triazinethiol of the above-mentioned amine salts are triazine-2,4,6-trithiol, 2-butylaminotriazine-4,6-dithiol, 2-hexylaminotriazine4,6-dithiol, 2-diethyl-aminotriazine-4,6-dithiol, 2-butoxytriazine-4,6-dithiol, and the like.

Examples of the amines are dicyclohexylamine, piperizine, dibutylamine, cyclohexylamine, tetramethylguanidine, diazacycloundecene, dipropylamine, di-tert-butylamine, and the like.

The triazinethiol.amine salts may be used alone or in any combination thereof.

The vulcanization agent according to the first aspect of the present invention may be formulated at a ratio of 0.001 to 0.25 mol, preferably 0.0015 to 0.02 mol, most preferably 0.003 to 0.013 mol, per 100 g of the chlorine-containing rubber (a) to obtain a vulcanized product having a preferable rubber elasticity and a sufficient elongation property.

In the second aspect of the present invention, the triazinethiol compounds are used as a vulcanization agent, in combination with the vulcanization aids as mentioned below, as essential components, together with the chlorine-containing rubber (a).

Typical examples of the triazinethiols having the above formula (II) are those mentioned above.

Vulcanization Aid (c)

As the vulcanization aid to be used in the second aspect of the present invention, aromatic carboxylic acid amine salts, aliphatic carboxylic acid amine salts and phenolamine salts represented by the above formulae (III) to (V) are used either singly or as a combination of two or more kinds thereof.

(c-1) Aromatic carboxylic acid amine salt

This type of vulcanization aid is represented by the above formula (III).

In such aromatic carboxylic acid amine salts of the formula (III), as the aromatic carboxylic acids for forming salts with amines, for example, benzoic acid, methylbenzoic acid, phthalic acid, benzenetricarboxylic acid, salicylic acid, p-oxybenzoic acid, and the like are preferably used.

(c-2) Aliphatic carboxylic acid amine salt

This type of vulcanization aid is represented by the above formula (IV).

In such aliphatic carboxylic acid amine salts of the formula (IV), as the carboxylic acid for forming salts with amines, specifically monocarboxylic acids such as acetic acid, propionic acid, butyric acid, isobutyric acid, valeric acid and the like; dicarboxylic acids such as oxalic acid, malonic acid, succinic acid, glutaric acid, adipic acid, and the like; and naphthenic acids; and the like are preferably used.

(c-3) Phenol amine salt

This type of vulcanization aid is represented by the above formula (V).

In such phenol amine salts of the formula (IV), as the phenol for forming salts with amines, for example, phenol, cresols and dihydrobenzenes such as hydroquinone, resorcin, etc., are preferably used.

Examples of the amine for forming salts with carboxylic acids or phenols as described above include dicyclohexylamine, piperidine, dibutylamine, cyclohexylamine, tetramethylguanidine, diazabicycloundecene, dipropylamine, di-tert-butylamine, and the like.

These vulcanization aids can be used either singly or as a combination of two or more kinds thereof.

The vulcanizable rubber composition according to the second aspect of the present invention contains the chlorine-containing rubber (a), the vulcanization agent (b), and the above vulcanization aid (c), as the essential components.

The vulcanization agent (b) may be formulated at a ratio of 0.001 to 0.025 mol, preferably 0.0015 to 0.02 mol, most preferably 0.003 to 0.013 mol, per 100 g of the chlorine-containing rubber (a) to obtain a vulcanized product having a preferably rubber elasticity and a sufficient elongation property.

On the other hand, the vulcanization aid (c) is used at a ratio generally of equimolar to 5-fold mols of the vulcanization agent (b), but particularly preferably at a ratio of 0.002 to 0.075 mol per 100 g of the chlorine-containing rubber (a) to perform a necessary vulcanization rate. Too much use of the vulcanization aid (c) may sometimes cause inconvenience such as foaming and the like.

Formulating Agents

In the rubber composition of the present invention, in addition to the above essential components, formulating agents known per se, depending on the properties of the intended vulcanized product, for example, reinforcing agents, fillers, softening agents, can be formulated.

In this case, the proportion of the chlorinecontaining rubber, which may also differ depending on the use, should be generally 25% by weight or more, particularly preferably 35% by weight or more.

As the reinforcing agent, for example, various carbon blacks such as SRF, GPE, FEF, HAF, ISAF, SAF, FT, MT, and fine powdery silica can be used. As the filler, for example, soft calcium carbonate, heavy calcium carbonate, talc, clay may be employed. These reinforcing agents and fillers are all formulated in amounts generally of 200 parts by weight or less, preferably 150 parts by weight or less, per 100 parts by weight of the chlorine-containing rubber.

Examples of the softening agent may include petroleum type substances such as process oil, lubricant oil, paraffin, fluid paraffin, petroleum asphalt, petrolatum; coal tars such as coal tar, coal tar pitch; fatty oils such as castor oil, perilla oil, rapeseed oil, coconut oil; tall oil; waxes such as sub, beeswax, carunauba wax, lanolin; fatty acids or metal salts thereof such as ricinoleic acid, palmitic acid, barium stearate, calcium stearate; synthetic polymer materials such as petroleum resin, atactic polypropylene, coumarone indene resin; ester type plasticizers such as dioctyl phthalate, dioctyl adipate; otherwise micro-crystalline wax, sub (factice), liquid polybutadiene, modified liquid polybutadiene, liquid thiocol, and the like.

These softening agents are formulated in amounts generally of 100 parts by weight or less, preferably 70 parts by weight or less, per 100 parts by weight of the chlorine-containing rubber.

Further, as the metal activating agent, magnesium oxide, higher fatty acid zinc, red lead, litharge, and calcium oxide, etc., can be used. These metal activating agents may be used in amounts of 3 to 15 parts by weight, preferably 5 to 10 parts by weight, per 100 parts by weight of the chlorine-containing rubber.

Further, to cope with the various rubber processing steps, a compound having an oxymethylene structure, and a scorch preventive can be added.

Examples of the compound having an oxymethylene structure include ethylene glycol, polyethylene glycol, propylene glycol, polypropylene glycol and the like, and these may be used in amounts generally of 2 to 100 parts by weight, preferably 3 to 5 parts by weight, per 100 parts of the chlorine-containing rubber.

As the scorch preventive, known scorch preventives can be used, as exemplified by maleic anhydride, thioimide type compounds, sulfonamide type compounds, etc. The above component may be employed at a ratio of 0.1 to 5.0 parts, preferably 0.3 to 3 parts by weight, per 100 parts by weight of the chlorine containing rubber.

Also, use of an antioxidant extends the material life of the vulcanized product obtained from the composition of the present invention, as in the case of conventional rubbers. As the antioxidant to be used in this case, for example, aromatic secondary amine type stabilizers such as phenylnaphthylamine, N,N'-di-2-naphthyl-p-phenylenediamine; phenol type stabilizers such as dibutylhydroxytoluene, tetrakis[methylene(3,5-di-t-butyl-4-hydroxy)hydrocinnamate]methane; thioether type stabilizers such as bis[2-methyl-4-(3-n-alkylthiopropionyloxy)-5-t-butyl-phenyl]sulfide; dithiocarbamic acid salt type stabilizers such as nickel dibutyldithiocarbamate may be formulated either singly or as a combination of two or more kinds thereof.

The amount of antioxidant used may be at a ratio generally of 0.1 to 5.0 parts by weight, preferably 0.5 to 3.0 parts by weight, per 100 parts by weight of the chlorine-containing rubber.

As the processing aid, those conventionally used in processing of rubber can be used, including ricinoleic acid, stearic acid, palmitic acid, lauric acid, barium stearate, calcium stearate, zinc stearate, esters of the above acids, higher fatty acids, and salts and esters thereof, etc. These processing aids usually may be employed in amounts of up to about 10 parts, preferably about 1 to 5 parts by weight, per 100 parts by weight of the chlorine-containing rubber.

In addition to the above-mentioned various formulating agents, conventional vulcanization aids may be optionally used. Preferable vulcanization aids are organic bases having an acid dissociation constant pKa of 7 or more those compounds capable of generating such organic bases. These vulcanization aids may be used in an amount of $5 \times 10^{-4}$ to $2 \times 10^{-2}$ mol, preferably $1 \times 10^{-3}$ to $1 \times 10^{-2}$ mol, per 100 g of chlorine-containing rubber.

Typical examples of such vulcanization aids are 1,8-diazabicyclo(5,4,0)-undecene-7, lauryl amine, benzyl amine, dibenzyl amine, N-methyl morpholine, dicyclohexyl amine, zinc dibutyl dithiocarbamate, piperizine salt of pentamethylene dithiocarbamate, N-cyclohexyl-2-benzothiazolyl sulfoneamide, dipentamethylene thiuram tetrasulfide, tetramethyl thiuram disulfide, tetramethyl phosphonium iodide, tetramethyl ammonium chloride, tetrabutyl phosphonium bromide, tetrabutyl ammonium chloride, and other onium salts.

Preparation of Rubber Composition

The rubber formulation may be prepared according to, for example, the following method. A chlorinated rubber and additives such as reinforcing agent, filler, softening agent are kneaded by a mixer such as a Banbury mixer at a temperature of 80 to 170° C. for 3 to 10 minutes, and then a vulcanization agent or a vulcanization agent and a vulcanization aid are added and mixed by rolls such as open rolls, kneaded at a roll temperature of 40 to 80° C. for 5 to 30 minutes, and taken out in divided portions to prepare ribbon-shaped or sheet-shaped rubber formulations. Alternatively, the chlorine rubber and the formulating agents can be fed directly into an extruder heated to 80 to 100°C., with a residence time of 0.5 to 5 minutes, whereby a rubber formulation in the shape of pellets can be prepared.

Vulcanization

The vulcanizable chlorine containing rubber composition thus prepared is molded to a desired shape by, for example, an extrusion molding machine, calender rolls, press, etc., and vulcanized simultaneously with molding or in a vulcanizing tank for a molded product thereof, according to the method in which heating is conducted at a temperature of 150 to 270° C. for 1 to 30 minutes.

As the vulcanization tank, a steam vulcanization can, hot air heating tank, glass beads fluidized bed, molten salt vulcanization tank, or microwave vulcanization tank may be singly or in combination.

Practical Application

The rubber composition of the present invention, even as the vulcanized product, per se, is useful for electrical insulating materials, automobile industry parts, rubber products for industry, civil engineering and construction material articles, and starting materials of rubber-lined cloths.

For electrical insulating materials, it may be employed specifically for caps for an automobile engine, such as plug caps, an ignition cap, a distributor cap; a condenser cap; insulating layers covering the current passage portion of wires in a cylindrical shape, such as wires for a ship, ignition cables for an automobile; cable joint covering; and the like.

For automobile industrial parts, it can be used for hoses such as radiator hose, fuel hose; automobile armoring parts such as bumpers, a bumper filler, bumper strips, bumper side guards, overriders, side protection laces; various weather stripes, boots, ball joint seals, and various antivibration rubber products.

For industrial rubber products, it can be used for rolls, packing, linings, belts, and for civil engineering and construction materials, it can be used for roofing sheets, heat-resistant belts, gaskets for construction, and highway joint seals. For rubber-lined cloth, it can be used for water-proof clothing, tents, and leisure sheets.

Expandable Rubber Composition

In the vulcanizable rubber composition of the present invention, by formulating a blowing agent and, if necessary, a blowing aid, prior to vulcanization, an expanded vulcanized product can be formed which can be used as a heat insulating material, cushioning material, ceiling material, soundproof material, and electrical insulating material.

Examples of the blowing agent may include inorganic blowing agents such as sodium hydrogen carbonate, sodium carbonate, ammonium hydrogen carbonate, ammonium carbonate, ammonium nitrite; nitrosocompounds such as N,N'-dimethyl-N,N'-dinitrosoterephthalamide, N,N'-di-nitrosopentamethylenetetramine; azo compounds such as azodicarbonamide, azobisisobutyronitrile, azocyclohexylnitrile, azodiaminobenzene, barium azodicarboxylate; sulfonylhydrazide compounds such as benzenesulfonylhydrazide, toluenesulfonylhydrazide, p,p'-oxybis-(benzenesulfonylhydrazide), diphenylsulfone-3,3'-disulfonylhydrazide; azide compounds such as calcium azide, 4,4'-diphenyldisulfonylazide, p-toluenesulfonylazide. In particular, nitroso compounds, azo compounds and azide compounds are preferably used.

These blowing agents are formulated at a ratio of 0.5 to 30 parts by weight, preferably 1 to 20 parts by weight, per 100 parts by weight of the chlorinated rubber, to form an expanded product having an apparent specific gravity of 0.03 to 0.7.

As the blowing aid, which can be also used together with the blowing agent, organic acids such as salicylic acid, phthalic acid, stearic acid or urea or derivatives thereof may be employed, to obtain functions such as a lowering of the decomposition temperature of the blowing agent, a decomposition acceleration, and a uniformization of cells.

EXAMPLES

The present invention will now be further illustrated by, but is by no means limited to, the following Examples.

EXAMPLE 1—1

A chlorinated ethylene-1-butene copolymer rubber was prepared according to the following method.

An ethylene-1-butene copolymer (ethylene content 92 mol%, Mooney viscosity $ML_{1+4}$ (100° C.) 21, 100g) was dissolved in 4 liters of carbon tetrachloride, and was subjected to chlorination reaction for 65 minutes, by introducing chlorine gas at a rate of 2.0 g/min. into the reaction vessel, while maintaining the temperature of a 6-liter glass reaction vessel equipped with a stirrer at 60° C. and a thermometer by irradiation of a 20W daylight fluorescent lamp from outside of the vessel. Then, nitrogen gas was passed through the reaction vessel to remove excess chlorine gas.

Next, a large excess of methanol was added to the solution to precipitate the chlorinated rubber, and the precipitate was filtered and then dried at room temperature under a reduced pressure.

The chlorine content in the chlorinated ethylene1-butene copolymer rubber thus prepared was measured by the bomb combustion method, and found to be 27% by weight, and the Mooney viscosity $ML_{1+4}$ (100° C.) was found to be 56.

Vulcanization agents were then prepared as follows.

A 27.2 g (0.1 mol) amount of dibutylamino.triazine.-dithiol was dissolved in 100 ml of methanol and 8.5 g (0.1 mol) of piperidine was dropwise added while stirring. The crystals precipitated were filtered and then dried, and thus a 32.4 g (yield 90.8%) of dibutylamino.-triazine.dithiol.piperidine salt (molar ratio 1:1) of white crystals was obtained. The melting point of this salt was 205° C.

Next, various formulating agents were formulated according to the following proportions.

| Chlorinated ethylene-α-olefin copolymer rubber | 100.0 g |
| --- | --- |
| Stearic acid | 1.0 g |
| Magnesium oxide*[1] | 7.0 g |
| FEF carbon*[2] | 50.0 g |
| Process oil*[3] | 20.0 g |
| Vulcanization agent | 0.006 mol |

*[1] trade name Kyowamag 150, produced by Kyowa Kagaku Co.
*[2] trade name Asahi #60, produced by Asahi Carbon Co.
*[3] trade name Diana Process Oil NS-220, produced by Idemitsu Kosan Co.

In carrying out the formulation, first the chlorinated ethylene-α-olefin copolymer rubber, stearic acid, magnesia, FEF carbon and the process oil were kneaded in a 4.3-liter Banbury mixer (OCC Model, produced by Kobe Seikosho) for 6 minutes and left to stand under room temperature for one day. Next, the vulcanizing agent was added to the kneaded product on 14 inch open rolls. The roll surface temperatures at this time were 60° C. for the front roll and 70° C. for the rear roll, with the rotational numbers being 16 rpm for the front roll and 18 rpm for the rear roll.

The formulated rubber was formed into a sheet and left to stand at room temperature for one hour, and the vulcanization curve at 160° C. was then obtained by an oscillating disc rheometer produced by Toyo Seiki (vulcanization curve A).

Figure 1:
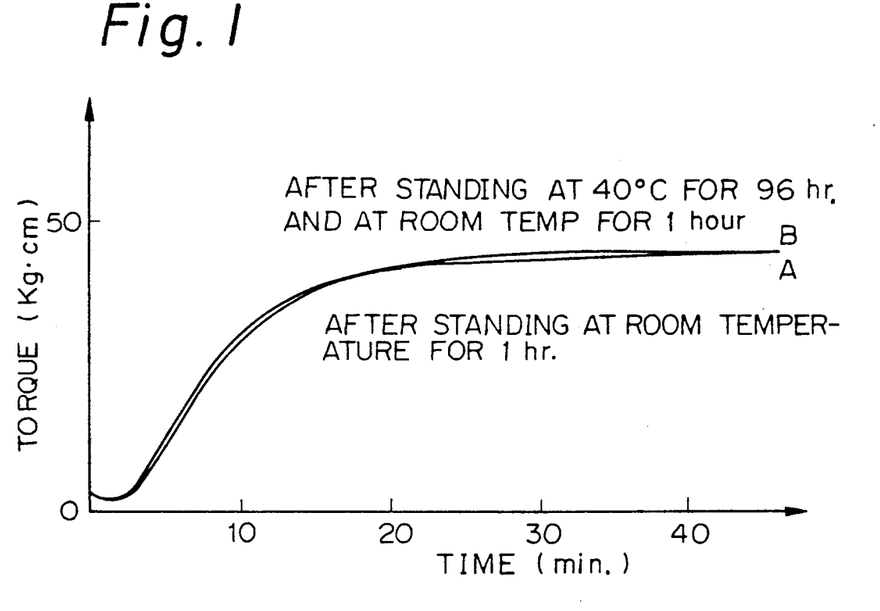
FIGS. 1 and 2 illustrate the vulcanization curves of the rubber compositions in Example Nos. 1—1 and 1—2, respectively.

Next, to determine the storage stability of the compound, the formulated rubber sheet was left to stand in an air oven at 40° C. for 96 hours. One hour after the sheet temperature returned to room temperature, the vulcanization curve at 160° C. was again obtained (vulcanization curve B). The results are shown in FIG. 1.

Further, the vulcanization rate constant was obtained from the vulcanization curve by the following formula.

$$l_n \frac{f_{max} - f_{20}}{f_{max} - f_{min}} = k$$

$f_{max}$: maximum torque value
$f_{min}$: minimum torque value
$f_{20}$: torque value after 20 minutes.

Further, the vulcanization rate constant ratio was determined by the following formula.

$$r = k_B/k_A$$

$k_A$: vulcanization rate constant determined from the vulcanization curve A $k_B$: vulcanization rate constant determined from the vulcanization curve B.

The vulcanization rate ratio (r) is shown in Table 1—1.

Next, the formulated rubber was left to stand for one hour after kneading and was then press vulcanized at ° C. for 20 minutes to prepare a vulcanized rubber sheet with a thickness of 2 mm, and the tensile strength and elongation of this sheet were measured according to the method of JIS K6301. Further, the vulcanized rubber sheet was subjected to heat-resistant aging at 135° C. for 72 hours, according to the method of JIS K6301. The results are shown in Table 1—1.

EXAMPLE 1—2

Example 1—1 was repeated except that cyclohexylamine was used in place of piperidine.

The dibutylaminotriazine.dicyclohexylamine salt in the form of white powder had a melting point of 123° C.

Figure 2:
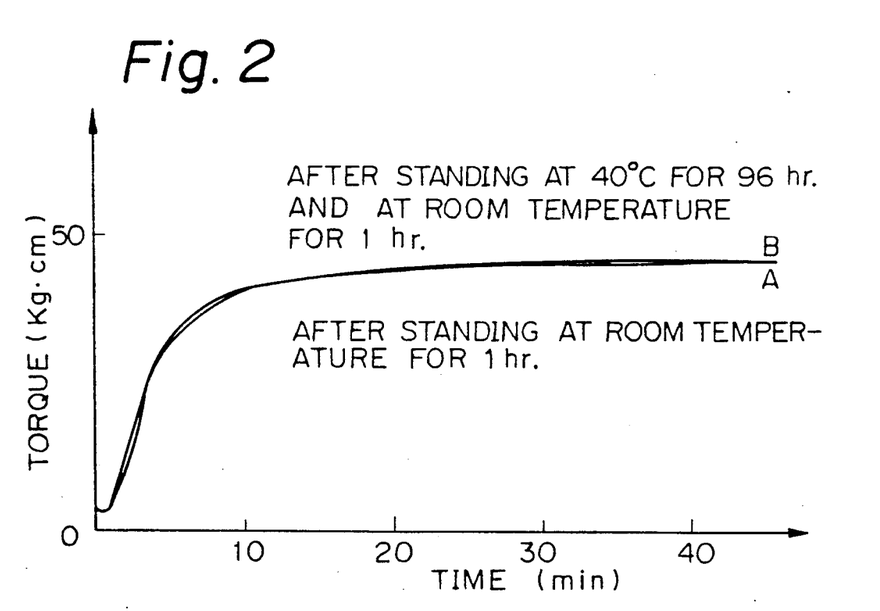

The results are shown in FIG. 2 and Table 1—1.

Comparative Example 1—1

The chlorinated ethylene-1-butene copolymer rubber prepared in Example 1—1 was used to formulate various formulating agents, in the following proportions.

| Chlorinated ethylene-1-butene copolymer rubber | 100.0 g |
| --- | --- |
| Stearic acid | 1.0 g |
| Magnesium oxide | 7.0 g |
| FEF carbon | 50.0 g |
| Process oil | 20.0 g |
| Dibutylaminotriazinedithiol*[1] | 0.006 mol |
| Pentamethylenedithiocarbamic acid piperidine salt*[2] | 0.012 mol |

*[1] trade name ZISNET-DB, produced by Sankyo Kasei Co.
*[2] trade name Nocceler PPD, produced by Oouchi Shinko Co.

Kneading and measurements were conducted in the same manner as in Example 1—1.

Figure 3:
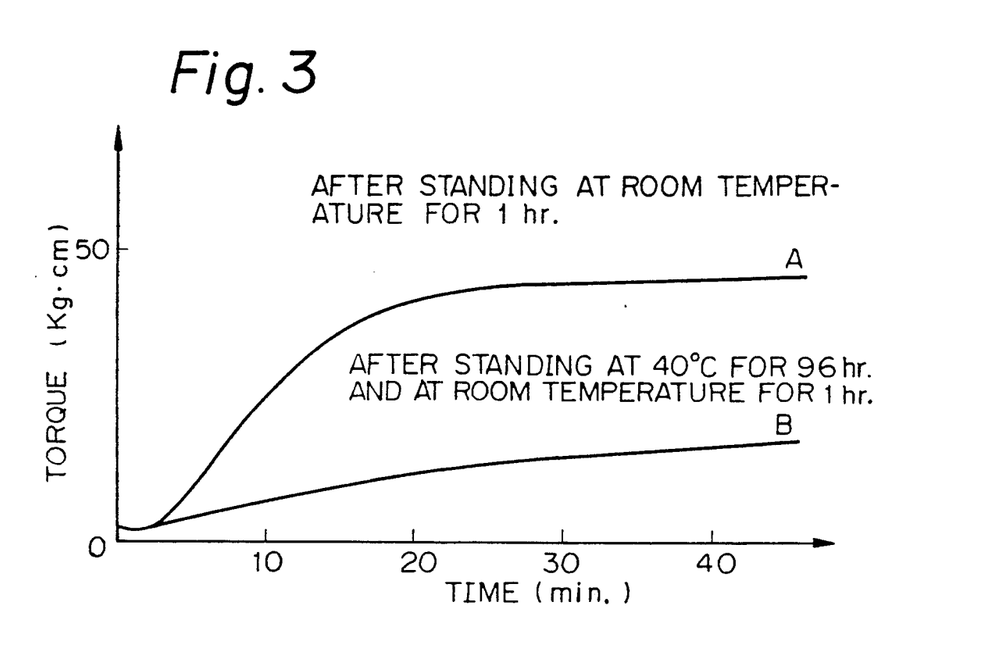
FIGS. 3 and 4 illustrate the vulcanization curves of the rubber compositions in Comparative Example Nos. 1—1 and 1—2; respectively.

The results are shown in FIG. 3 and Table 1—1.

Comparative Example 1—2

The chlorinated ethylene-1-butene copolymer rubber prepared in Example 1—1 ws used to formulate various formulating agents, in the following proportions.

| Chlorinated ethylene-1-butene copolymer rubber | 100.0 g |
| --- | --- |
| Stearic acid | 1.0 g |
| Magnesium oxide | 7.0 g |
| FEF carbon | 50.0 g |
| Process oil | 20.0 g |
| Dibutylaminotriazinedithiol | 0.006 mol |
| Pentamethylenedithiocarbamic acid dicyclohexylamine salt | 0.012 mol |

Kneading and measurements were conducted in the same manner as in Example 1—1.

Figure 4:
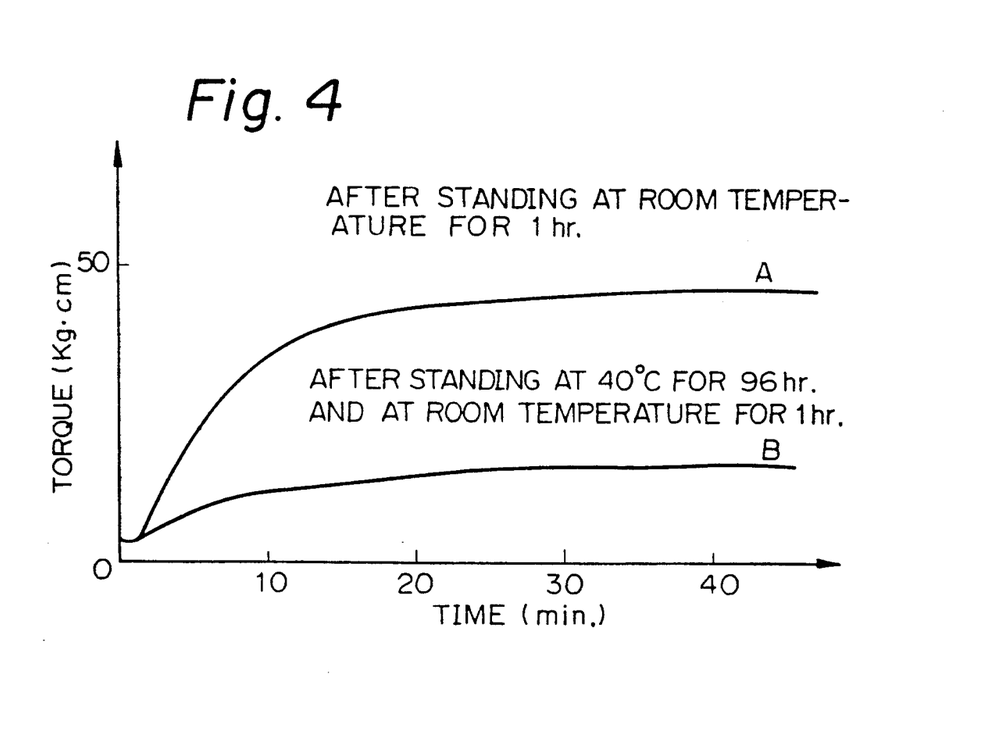

The results are shown in FIG. 4 and Table 1—1.

EXAMPLE 1—3

Example 1—1 was repeated except that triazine trithiol and dicyclohexylamine at a molar ratio of 1:3 were used in place of the 2-butylamino and the piperidine, respectively, to prepare the vulcanization agent. The salt was pale yellow and had a melting point of 193° C.

Next, various formulating agents were formulated in the following proportions.

| | |
|---|---|
| Chlorinated ethylene-1-butene copolymer rubber | 100.0 g |
| Stearic acid | 1.0 g |
| Magnesium oxide | 7.0 g |
| FEF carbon | 50.0 g |
| Process oil | 20.0 g |
| Vulcanization agent | 0.003 mol |

The resultant formulation kneaded and formed into a sheet in the same manner as in Example 1—1.

The vulcanized rubber sheet was prepared and the measurements were conducted in the same manner as in Example 1—1. The results are shown in Table 1—1.

EXAMPLE 1—4

A chlorinated ethylene-propylene-2-vinyl-5-norbornene copolymer rubber was prepared by the following method.

An ethylene-propylene-2-vinyl-5-norbornene copolymer rubber [ethylene content 80 mol%, iodine value 3, Mooney viscosity $ML_{1+4}$ (100° C.) 20] (100 g) was dissolved in 4 liters of carbon tetrachloride, and the solution was charged into a glass reactor of 6-liter volume equipped with a stirrer, a thermometer and a chlorine gas introducing pipe, and chlorination reaction was carried out for 55 minutes at a temperature maintained at 60° C. by irradiation of a 20W daylight fluorescent lamp from outside of the vessel simultaneously with an introduction of chlorine gas into the reactor. Then, nitrogen gas was passed through the reactor to remove excess chlorine gas.

To the solution were added 0.5 g of di-tert-butylhydroxytoluene and 0.5 g of calcium stearate, and the mixture was then thoroughly concentrated by an evaporator, and further thoroughly desolventized by a vacuum dryer at a normal temperature.

The chlorinated ethylene-propylene-2-vinyl-5-norbornene copolymer rubber was found to contain 25% by weight of chlorine and have a Mooney viscosity $ML_{1+4}$ (121° C.) of 55.

Except that the chlorinated ethylene-propylene-2-vinyl-5-norbornene copolymer rubber was used, the formation, kneading and sheet formation were conducted in the same manner as in Example 1—1.

A vulcanized rubber sheet was prepared in the same manner as in Example 1—and tested. The results are shown in Table 1—1.

EXAMPLE 1—5

A commercially available epichlorohydrin rubber was mixed according to the formulation recipe shown below, and tested.

| | |
|---|---|
| Epichlorohydrin rubber*¹ | 100.0 g |
| Stearic acid | 1.0 g |
| FEF carbon | 40.0 g |
| Magnesium oxide | 5.0 g |
| Vulcanization agent*² | 0.003 mol |

-continued

| | |
|---|---|
| Stabilizer*³ | 1.5 g |

*¹trade name Gechron 1100, produced by Nippon Zeon Co.

*²

Pale yellow powder
m.p. = 222° C.

*³trade name Nocrac 224, produced by Oouchi Shinko Co.

Kneading was carried out at a temperature of 60 to 70° C. for 20 minutes by 8-inch open rolls.

The kneaded rubber formulation was press molded at 160° C. under a pressure of 100 kg/cm² for 30 minutes to prepare a vulcanized rubber sheet with a thickness of 2 mm. The vulcanized rubber sheet was allowed to stand in a thermostat chamber at 25° C. for one day, and then measured. The measurement items were similar to those in Example 1—3 and the results are shown in Table 1—1.

EXAMPLE 1—6

A commercially available chlorinated polyethylene rubber was mixed according to the formulation recipe shown below, and tested.

| | |
|---|---|
| Chlorinated polyethylene*¹ | 100.0 g |
| Stearic acid | 1.0 g |
| SRF carbon*² | 50.0 g |
| Dioctyl terephthalate | 20.0 g |
| Magnesium oxide | 5.0 g |
| Vulcanization agent | 0.003 mol |

*¹Elaslen 401A, produced by Showa Denko Co.
*²Seast S, produced by Tokai Carbon Co.

Pale yellow powder
m.p. = 194° C.

Kneading was carried out at a temperature of 70 to 80° C. for 20 minutes by 8-inch open rolls.

The kneaded rubber formulation was press molded at 160° C. under a pressure of 100 kg/cm² for 30 minutes to prepare a vulcanized rubber sheet with a thickness of 2 mm. The vulcanized rubber sheet was left to stand in a thermostat chamber at 25° C. for one day, and then measured. The measurement items are similar to those of Example 1—3 and the results are shown in Table 1—1.

Comparative Example 1—3

Example 1—3 was repeated except that the formulation in Example 3 was changed as shown below.

| | |
|---|---|
| Chlorinated ethylene-1-butene copolymer rubber | 100.0 g |
| Stearic acid | 1.0 g |
| Magnesium oxide | 7.0 g |
| FEF carbon | 50.0 g |
| Process oil | 20.0 g |
| Vulcanization agent | 0.0009 mol |

The results are shown in Table 1—1.

Comparative Example 1—4

Example 1—2 was repeated except that the formulation in Example 1—2 was changed as shown below.

| | |
|---|---|
| Chlorinated ethylene-1-butene copolymer rubber | 100.0 g |
| Stearic acid | 1.0 g |
| Magnesium oxide | 7.0 g |
| FEF carbon | 50.0 g |
| Process oil | 20.0 g |
| Vulcanization agent | 0.02 mol |

The results are shown in Table 1—1.

TABLE 1—1

| | Example | | Comparative Example | | Example | | | | Comparative Example | |
|---|---|---|---|---|---|---|---|---|---|---|
| | 1—1 | 1—2 | 1—1 | 1—2 | 1—3 | 1—4 | 1—5 | 1—6 | 1—3 | 1—4 |
| Chlorine Containing Rubber (wt. part) | | | | | | | | | | |
| Chlorinated ethylene.1-butene copolymer rubber | 100 | 100 | 100 | 100 | 100 | — | — | — | 100 | 100 |
| Chlorinated ethylene.propylene. 5-vinyl-2-norbornene copolymer rubber | — | — | — | — | — | 100 | — | — | — | — |
| Epichlorohydrin rubber | — | — | — | — | — | — | 100 | — | — | — |
| Chlorinated polyethylene | — | — | — | — | — | — | — | 100 | — | — |
| Vulcanization agent (mol) | | | | | | | | | | |
| (n-Bu)₂N-triazine-bis(SH)/mono(N.HN-cyclohexyl) | 0.006 | — | — | — | — | 0.006 | — | — | — | — |
| (n-Bu)₂N-triazine-bis(SH)/mono(N.HN-dicyclohexyl) | — | 0.006 | — | — | — | — | — | — | — | — |
| HS-triazine-bis(SH)/mono(N2.HN-dicyclohexyl) | — | — | — | — | 0.003 | — | 0.003 | 0.0009 | 0.03 | |
| HS-triazine-bis(SH)/mono(N2.HN-dicyclohexyl) variant | — | — | — | — | — | — | 0.003 | — | — | — |
| (n-Bu)₂N-triazine-bis(SH) | — | — | 0.006 | 0.006 | — | — | — | — | — | — |
| Vulcanization Aid | | | | | | | | | | |
| Piperidine-C(=S)-SH.HN-piperidine | — | — | — | 0.012 | — | — | — | — | — | — |

TABLE 1—1-continued

|  | Example | | Comparative Example | | Example | | | | Comparative Example | |
| --- | --- | --- | --- | --- | --- | --- | --- | --- | --- | --- |
|  | 1—1 | 1—2 | 1—1 | 1—2 | 1—3 | 1—4 | 1—5 | 1—6 | 1—3 | 1—4 |
| [structure: N—C(=S)—SH·HN with two cyclohexyl groups] | — | — | — | 0.012 | — | — | — | — | — | — |
| Vulcanization rate constant ratio ($k_A/k_B$) | 1.0 | 1.0 | 0.4 | 0.6 | 1.0 | 1.0 | 1.0 | 1.0 | 1.0 | 1.0 |
| Normal state |  |  |  |  |  |  |  |  |  |  |
| Tensile strength $T_B$ (kg/cm$^2$) | 192 | 189 | 165 | 161 | 185 | 175 | 181 | 210 | 71 | 170 |
| Elongation $E_B$ (%) | 530 | 500 | 540 | 530 | 500 | 560 | 370 | 580 | >1000 | 90 |
| Heat resistance aging 135° C.-72 hr |  |  |  |  |  |  |  |  |  |  |
| Tensile strength retaining $A_R$ ($T_B$) | 98 | 96 | 81 | 79 | 95 | 94 | 86 | 92 | — | — |
| Elongation retaining $A_R$ ($E_B$) | 95 | 96 | 76 | 75 | 97 | 97 | 61 | 100 | — | — |

EXAMPLE 2—1

A chlorinated ethylene-1-butene copolymer rubber was prepared in the same manner as in Example 1—1.

Vulcanizing aids were prepared as follows.

To a solution of 12.2 g (0.1 mol) of benzoic acid dissolved in 100 ml of acetone, 8.5 g (0.1 mol) of piperidine was added dropwise. The crystals precipitated were filtered, and then dried, and benzoic acid piperidine salt (molar ratio 1:1) of white crystals was obtained in an amount of 18.6 g (yield 89.9%).

Similarly, to a solution of 12.2 g (0.1 mol) of benzoic acid dissolved in 100 ml of acetone, 17.7 g (0.1 mol) of dicyclohexylamine was added dropwise. The crystals precipitated were filtered and then dried, and Benzoic acid dicyclohexylamine salt (molar ratio 1:1) of white crystals was obtained in an amount of 26.2 g (yield 90.0%).

Next, various formulating agents were formulated in the following proportions.

| Chlorinated ethylene-1-butene copolymer rubber | 100.0 g |
| --- | --- |
| Stearic acid | 1.0 g |
| Magnesium oxide*1 | 7.0 g |
| FEF carbon*2 | 50.0 g |
| Process oil*3 | 20.0 g |
| Dibutylaminotriazinedithiol*4 | 0.007 mol |
| Benzoic acid piperidine salt | 0.014 mol |
| Benzoic acid dicyclohexylamine salt | 0.003 mol |

*1 trade name Kyowamag 150, produced by Kyowa Kagaku Co.
*2 trade name Asahi #60, produced by Asahi Carbon Co.
*3 trade name Diana Process Oil NS-220, produced by Idemitsu Kosan Co.
*4 trade name ZISNET-DB, produced by Sankyo Kasai Co.

In carrying out the formulation, first the chlorinated ethylene-α-olefin copolymer rubber, stearic acid, magnesia, FEF carbon, and the process oil were kneaded in a 4.3-liter Banbury mixer (OCC Model, produced by Kobe Seikosho) for 6 minutes and allowed to stand under room temperature for one day. The vulcanization agent was then added to the kneaded product on 14 inch open rolls. The roll surface temperatures at this time were 60° C. for the front roll and 70° C. for the rear roll, with the rotational numbers being 16 rpm for the front roll and 18 rpm for the rear roll.

The formulated rubber was formed into a sheet and allowed to stand at room temperature for one hour, and the vulcanization curve at 160° C. was then obtained by an oscillating disc rheometer produced by Toyo Seiki (vulcanization curve A).

Figure 5:
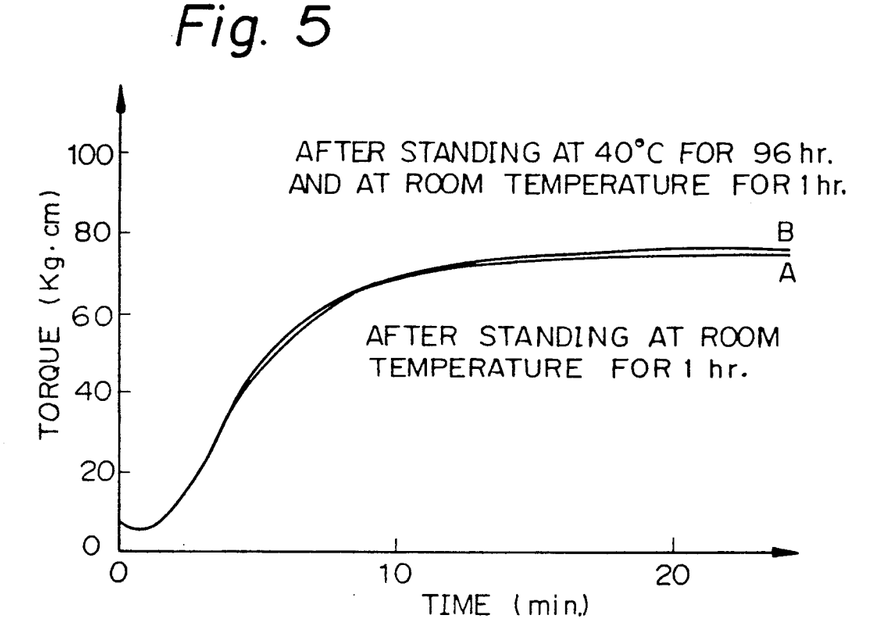
FIGS. 5 to 7 illustrate the vulcanization curves of the rubber compositions in Example Nos. 2—1 to 2—3, respectively; and, FIGS. 8 to 10 illustrate the vulcanization curves of the rubber compositions in Comparative Example Nos. 2—1 to 2—3, respectively.

Next, to determine the storage stability of the compound, the formulated rubber sheet was left to stand in an air oven controlled at 40° C. for 96 hours, and one hour after the temperature of the sheet returned to room temperature, the vulcanization curve at 160° C. was again obtained (vulcanization curve B). The results are shown in FIG. 5.

Further, the vulcanization rate constant was obtained from the vulcanization curve in the same manner as in Example 1—1.

EXAMPLE 2—2

Example 2—1 was repeated except that the formulated recipe in Example 2—1 was changed as shown below.

| Chlorinated ethylene-1-butene copolymer rubber | 100.0 g |
| --- | --- |
| Stearic acid | 1.0 g |
| Magnesium oxide*1 | 7.0 g |
| FEF carbon*2 | 50.0 g |
| Process oil*3 | 20.0 g |
| Dibutylaminotriazinedithiol | 0.007 mol |
| Benzoic acid piperidine salt | 0.014 mol |

Figure 6:
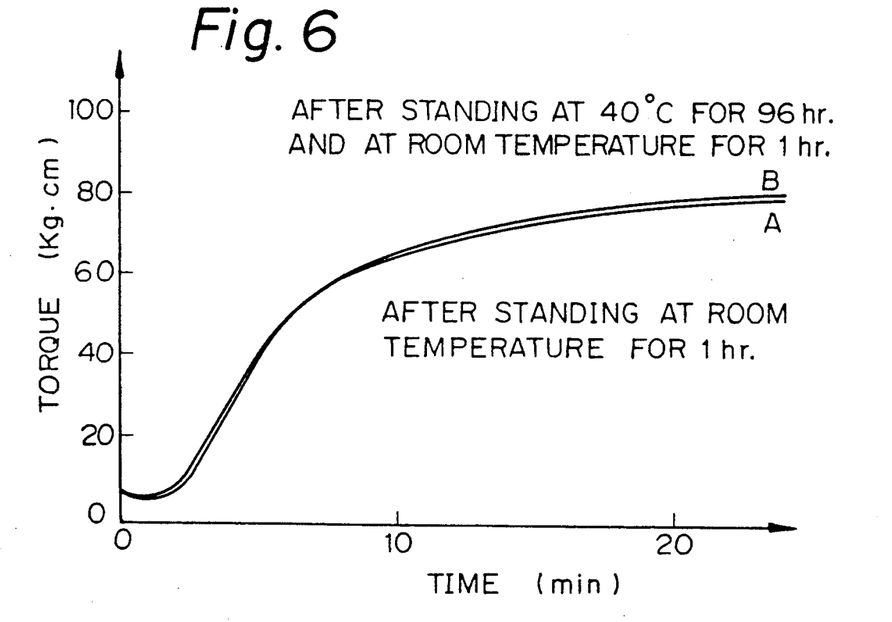

The results are shown in Table 2—1 and FIG. 6.

EXAMPLE 2—3

Example 2—1 was repeated except that the formulated recipe in Example 2—1 was changed as shown below.

| Chlorinated ethylene-1-butene copolymer rubber | 100.0 g |
| --- | --- |
| Stearic acid | 1.0 g |
| Magnesium oxide*1 | 7.0 g |
| FEF carbon*2 | 50.0 g |
| Process oil*3 | 20.0 g |
| Dibutylaminotriazinedithiol | 0.007 mol |
| Dicyclohexylamine | 0.010 mol |

Figure 7:
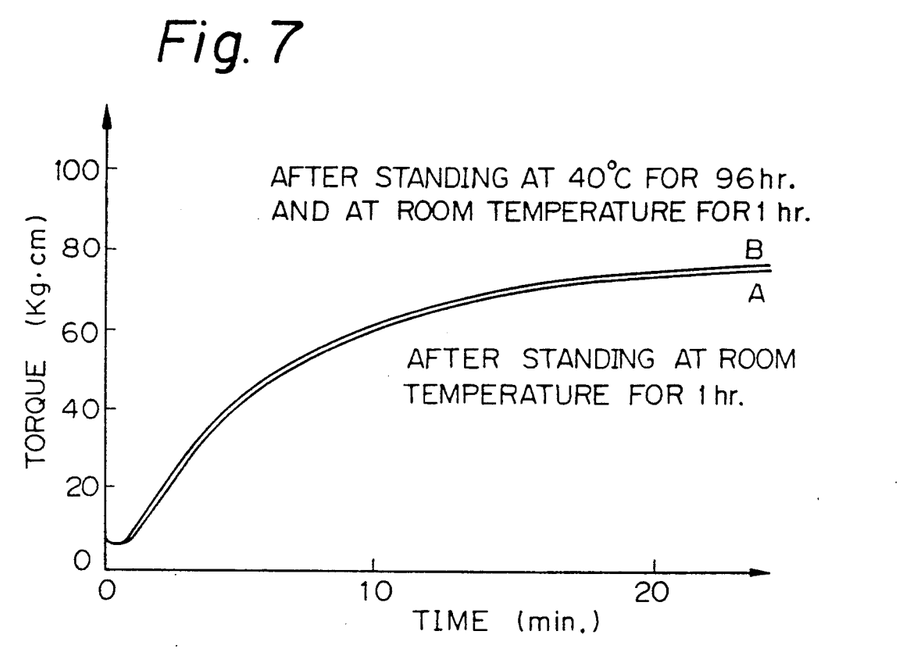

The results are shown in Table 2—1 and FIG. 7.

Comparative Example 2—1

The chlorinated ethylene-1-butene copolymer rubber prepared in Example 2—1 was used to formulate various formulating agents, in the following proportions.

| | |
|---|---|
| Chlorinated ethylene-1-butene | 100.0 g |
| Stearic acid | 1.0 g |
| Magnesium oxide | 7.0 g |
| FEF carbon | 50.0 g |
| Process oil | 20.0 g |
| Dibutylaminotriazinedithiol | 0.007 mol |
| Pentamethylenedithiocarbamic acid piperidine salt*1 | 0.014 mol |

*1trade name Nocceler PPD, produced by Oouchi Shinko Co.

Figure 8:
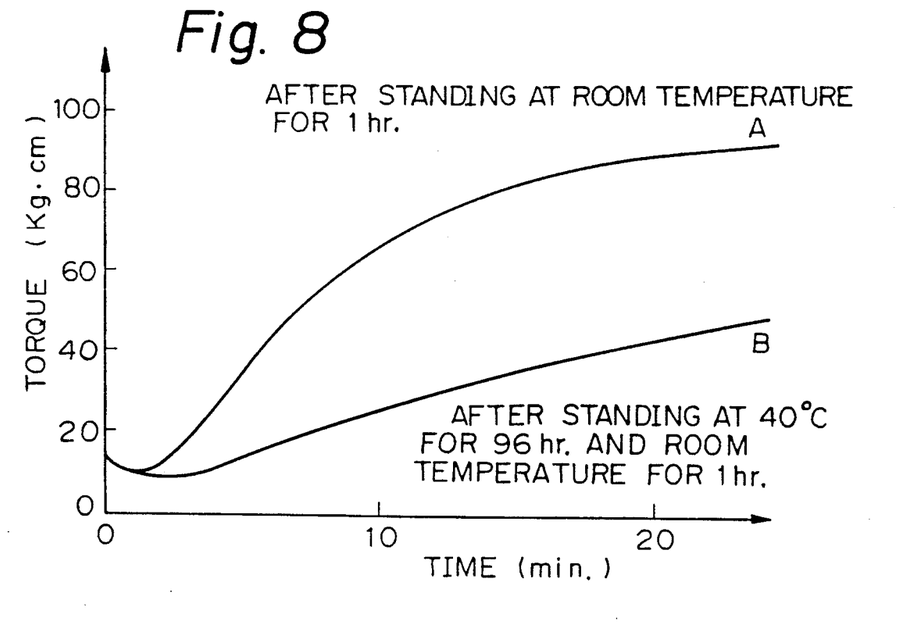

Kneading and measurements were conducted in the same manner as in Example 2—1.
The results are shown in FIG. 8 and Table 2—1.

Comparative Example 2—2

The chlorinated ethylene-1-butene copolymer rubber prepared in Example 2—1 was used to formulate various formulating agents, in the following proportions.

| | |
|---|---|
| Chlorinated ethylene-1-butene copolymer rubber | 100.0 g |
| Stearic acid | 1.0 g |
| Magnesium oxide | 7.0 g |
| FEF carbon | 50.0 g |
| Process oil | 20.0 g |
| Dibutylaminotriazinedithiol | 0.007 mol |
| Pentamethylenedithiocarbamic acid dicyclohexylamine salt | 0.014 mol |

Figure 9:
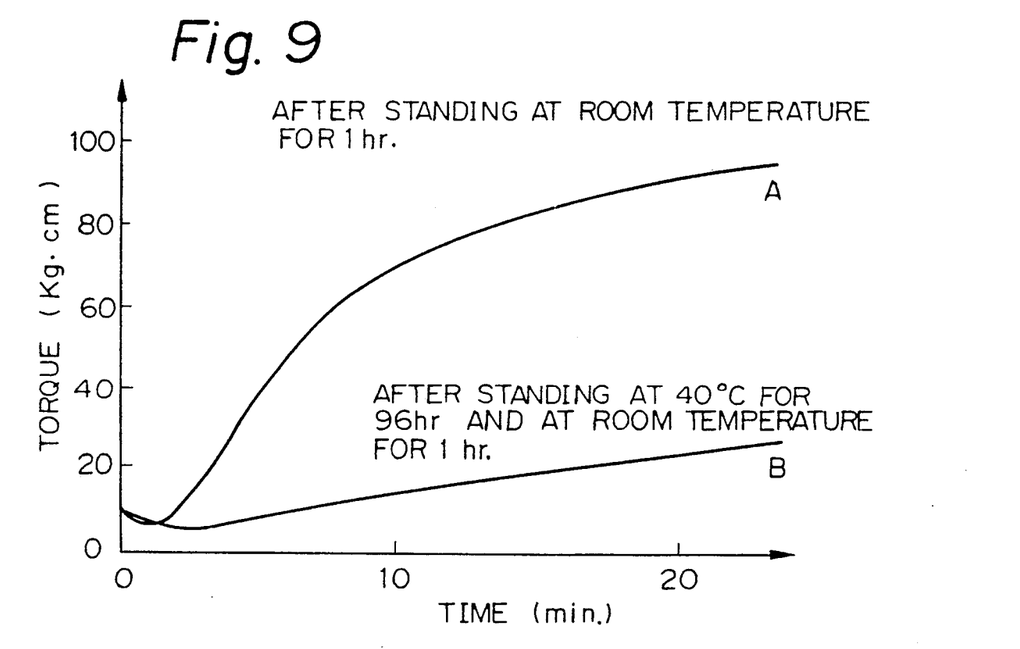

Kneading and measurements were conducted in the same manner as in Example 2—1.
The results are shown in FIG. 9 and Table 2—1.

Comparative Example 2—3

The chlorinated ethylene-1-butene copolymer rubber prepared in Example 2—1 was used to formulate various formulating agents, in the following proportions.

| | |
|---|---|
| Chlorinated ethylene-1-butene copolymer rubber | 100.0 g |
| Stearic acid | 1.0 g |
| Magnesium oxide | 7.0 g |
| FEF carbon | 50.0 g |
| Process oil | 20.0 g |
| Dibutylaminotriazinedithiol | 0.007 mol |
| 2-Mercaptobenzothiazole dicyclohexylamine salt | 0.014 mol |

Figure 10:
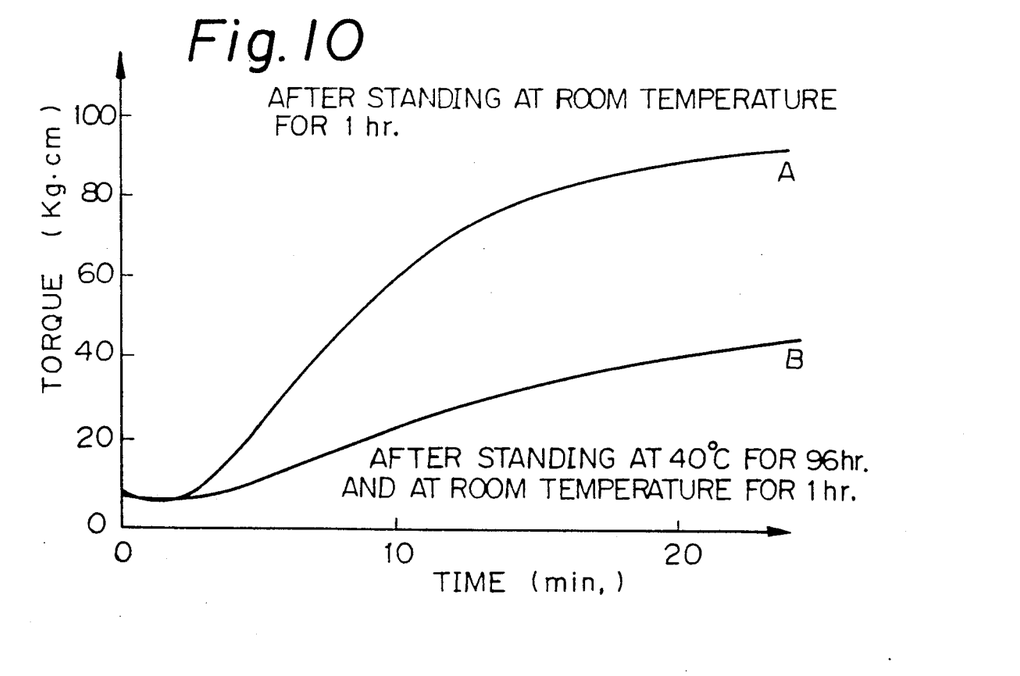

Kneading and measurements were conducted in the same manner as in Example 2—1.
The results are shown in FIG. 10 and Table 2—1.

Comparative Example 2—4

The chlorinated ethylene-1-butene copolymer rubber prepared in Example 2—1 was used to formulate various formulating agents, in the following proportions.

| | |
|---|---|
| Chlorinated ethylene-1-butene copolymer rubber | 100.0 g |
| Stearic acid | 1.0 g |
| Magnesium oxide | 7.0 g |
| FEF carbon | 50.0 g |
| Process oil | 20.0 g |
| Dibutylaminotriazinedithiol | 0.007 mol |
| Piperidine | 0.014 mol |

The resultant formulation was kneaded and formed into a sheet in the same manner as in Example 2—1, and a vulcanized sheet was prepared in the same manner as in Example 2—1 and tested. The results are shown in Table 2—1.

EXAMPLE 2—4

Example 2-1 was repeated except that triazinetrithiol was used in place of dibutylaminotriazinethiol as the vulcanization agent in Example 2—1 and various formulating agents were formulated in the following proportions.

| | |
|---|---|
| Chlorinated ethylene-1-butene copolymer rubber | 100.0 g |
| Stearic acid | 1.0 g |
| Magnesium oxide*1 | 7.0 g |
| FEF carbon*2 | 50.0 g |
| Process oil*3 | 20.0 g |
| Triazinetrithiol | 0.003 mol |
| Benzoic acid dicyclohexylamine salt | 0.010 mol |

*1, *2, *3: see above

Kneading and measurements were conducted in the same manner as in Example 2—1. The results are shown in Table 2—1.

EXAMPLE 2—5

Example 2—1 was repeated except that the phenol piperidine salt prepared according to the method as described below was used in place of the benzoic acid piperidine salt as the vulcanization aid in Example 2—1 and formulated according to the recipe shown below.

Preparation of Vulcanization Aid

To a solution of 9.4 g (0.1 mol) of phenol dissolved in 100 ml of acetone, 8.5 g (0.1 mol) of piperidine was added dropwise under stirring, and the precipitated crystals were filtered and dried, to obtain a 17.0 g (yield 55.0%) of phenol piperidine salt (molar ratio 1:1) of white crystals.

| | |
|---|---|
| Chlorinated ethylene-1-butene copolymer rubber | 100.0 g |
| Stearic acid | 1.0 g |
| Magnesium oxide | 7.0 g |
| FEF carbon | 50.0 g |
| Process oil | 20.0 g |
| Dibutylaminotriazinedithiol | 0.007 mol |
| Phenol piperidine salt | 0.014 mol |

Kneading and measurements were conducted in the same manner as in Example 2—1. The results are shown in Table 2—1.

EXAMPLE 2—6

Example 2—1 was repeated except that the adipic acid piperidine salt prepared according to the method as described below was used in place of the benzoic acid piperidine salt used as the vulcanization aid in Example 2—1, and formulated according to the recipe shown below.

Preparation of Vulcanization Aid

To a solution of 7.3 g (0.05 mol) of adipic acid dissolved in 100 ml of methanol, 8.5 g (0.1 mol) of piperidine was added dropwise under stirring, and the precipitate crystals were filtered and dried, to obtain a 13.3 g (yield 55.0%) of adipic acid piperidine salt (molar ratio 1:2) of white crystals.

| | |
|---|---|
| Chlorinated ethylene-1-butene copolymer rubber | 100.0 g |
| Stearic acid | 1.0 g |
| Magnesium oxide | 7.0 g |
| FEF carbon | 50.0 g |
| Process oil | 20.0 g |
| Dibutylaminotriazinedithiol | 0.007 mol |
| Adipic acid piperidine salt | 0.007 mol |

Kneading and measurements were conducted in the same manner as in Example 2—1. The results are shown in Table 2—1.

EXAMPLE 2—7

A chlorinated ethylene-propylene-2-vinyl-5-norbornene copolymer rubber was prepared according to the following method.

An ethylene-propylene-2-vinyl-5-norbornene copolymer rubber [ethylene content 80 mol%, iodine value 3, Mooney viscosity $ML_{1+4}$ (100° C.) 20] (100 g) was dissolved in 4 liters of carbon tetrachloride, and the solution was charged into a glass reactor of 6-liter volume equipped with a stirrer, a thermometer and a chlorine gas introducing pipe, and chlorination reaction was carried out for 55 minutes at a temperature maintained at 60° C., by irradiation of a 20W daylight fluorescent lamp from outside of the vessel, simultaneously with an introduction of chlorine gas into the reactor. Then, nitrogen gas was passed through the reactor to remove excess chlorine gas.

To the solution, were added, 0.5 g of di-tert-butylhydroxytoluene and 0.5 g of calcium stearate, and the mixture was then concentrated by an evaporator, and further thoroughly desolventized by a vacuum drier at normal temperature.

The chlorinated ethylene-propylene-2-vinyl-5-norbornene copolymer rubber was found to contain 25% by weight of chlorine and have a Mooney viscosity $ML_{1+4}$ (121° C.) of 55.

Except that the chlorinated ethylene-propylene-2-vinyl-5-norbornene copolymer rubber was used, the formation, kneading, and sheet formation were conducted in the same manner as in Example 2—1.

A vulcanized rubber sheet was prepared in the same manner as in Example 2—1 and tested. The results are shown in Table 2—1.

EXAMPLE 2—8

A commercially available epichlorohydrin rubber was mixed according to the formulation recipe shown below, and tested.

| | |
|---|---|
| Epichlorohydrin rubber | 100.0 g |
| Stearic acid | 1.0 g |
| FEF carbon | 40.0 g |
| Magnesium oxice | 5.0 g |
| Triazinetrithiol*[1] | 0.003 mol |
| Benzoid acid piperidine salt | 0.009 mol |
| Stabilizer*[2] | 1.5 g |

*[1]trade name Gechron 1100, produced by Nippon Zeon Co.
*[2]trade name Nacrac 224, produced by Oouchi Shinko Co.

Kneading was carried out at 60° C. to 70° C. for 20 minutes by 8-inch open rolls.

The kneaded rubber formulation was press molded at 160° C. under a pressure of 100 kg/cm² for 30 minutes to prepare a vulcanized rubber sheet with a thickness of 2 mm. The vulcanized rubber sheet was left to stand in a thermostat chamber at 25° C. for one day and then measured. The measurement results are shown in Table 2—1.

EXAMPLE 2—9

A commercially available chlorinated polyethylene rubber was mixed according to the formulation recipe shown below, and tested.

| | |
|---|---|
| Chlorinated polyethylene*[1] | 100.0 g |
| Stearic acid | 1.0 g |
| SRF carbon*[2] | 50.0 g |
| Dioctyl terephthalate | 20.0 g |
| Magnesium oxide | 5.0 g |
| Bibutylaminotriazinedithiol | 0.007 mol |
| Benzoic acid dicyclohexylamine salt | 0.014 mol |

*[1]Elaslen 401A, produced by Showa Denko Co.
*[2]Seast S, produced by Tokai Carbon Co.

Kneading was carried out at a temperature of 70 to 80° C. for 20 minutes by 8-inch open rolls.

The kneaded rubber formulation was press molded at 160° C. under a pressure of 100 kg/cm² for 30 minutes to prepare a vulcanized rubber sheet with a thickness of 2 mm. The vulcanized rubber sheet was left to stand in a thermostat chamber at 25° C. for one day and then measured. The measurement results are shown in Table 2—1.

Comparative Example 2—5

Example 2—3 was repeated except that the formulation in Example 2—3 was changed as shown below.

| | |
|---|---|
| Chlorinated ethylene-1-butene copolymer rubber | 100.0 g |
| Stearic acid | 1.0 g |
| Magnesium oxide | 7.0 g |
| FEF carbon | 50.0 g |
| Process oil | 20.0 g |
| Dibutylaminotriazinedithiol | 0.0009 mol |
| Benzoic acid piperidine salt | 0.0018 mol |

The results are shown in Table 2—1.

Comparative Example 2—6

Example 2—2 was repeated except that the formulation in Example 2—2 was changed as shown below.

| | |
|---|---|
| Chlorinated ethylene-1-butene copolymer rubber | 100.0 g |
| Stearic acid | 1.0 g |
| Magnesium oxide | 7.0 g |
| FEF carbon | 50.0 g |
| Process oil | 20.0 g |
| Vulcanization agent: dibutylaminotriazinedithiol | 0.03 mol |
| Vulcanization aid: benzoic acid | 0.06 mol |

The results are shown in Table 2—1.

TABLE 2-1

|  | Example | | | Comparative Example | | | | Example | | | | | | Comparative Example | |
|---|---|---|---|---|---|---|---|---|---|---|---|---|---|---|---|
|  | 2-1 | 2-2 | 2-3 | 2-1 | 2-2 | 2-3 | 2-4 | 2-4 | 2-5 | 2-6 | 2-7 | 2-8 | 2-9 | 2-5 | 2-6 |
| Chlorine containing rubber (wt. parts) | | | | | | | | | | | | | | | |
| Chlorinated ethylene-1-butene copolymer rubber [Cl content = 27 wt %, $ML_{1+4}$ (100° C.) = 56] | 100 | 100 | 100 | 100 | 100 | 100 | 100 | 100 | 100 | 100 | — | — | — | 100 | 100 |
| Chlorinated ethylene-propylene-vinylnorbornene copolymer rubber [Cl content = 25 wt %, $ML_{1+4}$ (121° C.) = 55] | — | — | — | — | — | — | — | — | — | — | 100 | — | — | — | — |
| Epichlorohydrin rubber | — | — | — | — | — | — | — | — | — | — | — | 100 | — | — | — |
| Chlorinated polyethylene | — | — | — | — | — | — | — | — | — | — | — | — | 100 | — | — |
| Vulcanization agent (mol) | | | | | | | | | | | | | | | |
| Dibutylaminotriazinedithiol | 0.007 | 0.007 | 0.007 | 0.007 | 0.007 | 0.007 | 0.007 | — | 0.007 | 0.007 | 0.007 | — | 0.007 | 0.0009 | 0.003 |
| Triazinetrithiol | — | — | — | — | — | — | — | 0.003 | — | — | — | 0.003 | — | — | — |
| Vulcanization aid (mol) | | | | | | | | | | | | | | | |
| Benzoic acid-piperidine salt (1:1) | 0.014 | 0.014 | — | — | — | — | — | — | — | — | 0.014 | 0.009 | — | 0.0018 | 0.06 |
| Benzoic acid-dicyclohexyl-amine salt (1:1) | 0.003 | — | 0.014 | — | — | — | — | 0.010 | — | — | — | — | 0.014 | — | — |
| Phenol-piperidine salt (1:1) | — | — | — | — | — | — | — | — | 0.014 | — | — | — | — | — | — |
| Adipic acid-piperidine salt (1:2) | — | — | — | — | — | — | — | — | — | 0.007 | — | — | — | — | — |
| Pentamethylenedithiocarbamic acid-piperidine salt (1:1) | — | — | — | 0.014 | — | — | — | — | — | — | — | — | — | — | — |
| Pentamethylenedithiocarbamic acid-dicyclohexylamine salt (1:1) | — | — | — | — | 0.014 | — | — | — | — | — | — | — | — | — | — |
| 2-mercaptobenzothiol-piperidine salt (1:1) | — | — | — | — | — | 0.014 | — | — | — | — | — | — | — | — | — |
| Piperidine | — | — | — | — | — | — | 0.014 | — | — | — | — | — | — | — | — |
| Vulcanization rate constant ratio $k_B/k_A$ | 1.0 | 1.0 | 1.0 | 0.4 | 0.3 | 0.5 | — | 1.0 | 1.0 | 1.0 | 1.0 | 1.0 | 1.0 | — | — |
| Normal state | | | | | | | | | | | | | | | |
| Tensile strength TB (kg/cm²) | 173 | 176 | 181 | 168 | 165 | 163 | 94 | 169 | 175 | 181 | 196 | 181 | 210 | 65 | 169 |
| Elongation EB (%) | 510 | 540 | 720 | 510 | 490 | 500 | >1000 | 620 | 500 | 520 | 650 | 370 | 580 | >1000 | 80 |
| Heat-resistant aging | | | | | | | | | | | | | | | |
| Tensile strength retentivity AR (TB) (%) | 100 | 100 | 100 | 80 | 79 | 81 | — | 95 | 100 | 98 | 100 | 86 | 93 | — | — |
| Elongation retentivity AR (EB) (%) | 90 | 85 | 78 | 76 | 77 | 75 | — | 72 | 86 | 91 | 86 | 63 | 95 | — | — |

We claim:

1. A vulcanizable rubber composition comprising:
   (a) a chlorine-containing rubber;
   (b) as a vulcanization agent, a triazinethiol having the formula:

(II)

wherein $R_1$ represents $-NR_4R_5$, $-OR_4$ or $-SR_4$, where
   $R_4$ and $R_5$ independently represent a hydrogen atom, an alkyl group or an aryl group, the vulcanization agent present in a ratio of 0.001 to 0.025 mol per 100 g of the chlorine-containing rubber; and
   (c) as a vulcanization aid, at least one component selected from the group consisting of:

(c-1) aromatic carboxylic acid amine salts having the formula:

(III)

wherein m is a number of 1 to 3, p is a number of 1 to 3;
   $m \geq p$;
   $R_6$ represents a hydrogen atom, an alkyl group, a halogen, a nitro group, a cyano group or a hydroxy group;
   $R_7$ and $R_8$ each represent a hydrogen atom, an alkyl or cycloalkyl group or an aryl group, and $R_7$ and $R_8$ may be bonded to each other to form a ring, (c-2) aliphatic carboxylic acid amine salts having the formula:

(IV)

wherein m, p, $R_7$, and $R_8$ are as defined above;
$R_9$ represents a monovalent to trivalent hydrocarbon group or a direct bond, and
(c-3) phenolamine salts having the formula:

(V)

wherein $R_6$, $R_7$ and $R_8$ are as described above, and g represents a number of 1 or 2.

2. A rubber composition as claimed in claim 1, wherein the chlorine-containing rubber (a) is a chlorinated ethylene-α-olefin copolymer rubber having a chlorine content of 5 to 45% by weight.

3. A rubber composition as claimed in claim 1, wherein the chlorine-containing rubber (a) is an epichlorohydrin rubber having a Mooney viscosity $ML_{1+4}$ (100° C.) of 20 to 150.

4. A rubber composition as claimed in claim 1, wherein the chlorine-containing rubber (a) is a chlorinated polyethylene having a chlorine content of 10 to 40% by weight.

5. A rubber composition as claimed in claim 1, wherein the vulcanization aid (c) is formulated at a ratio of 0.002 to 0.075 mol per 100 g of the chlorine-containing rubber (a).

6. A rubber composition as claimed in claim 1, wherein the vulcanization aid (b) is a dialkylaminotriazinethiol 7. A rubber composition as claimed in claim 1, wherein the vulcanization aid (b) is triazinetrithiol.

8. A rubber composition as claimed in claim 1, wherein in the aromatic carboxylic acid amine salts (c-1) having the above formula (III), the aromatic carboxylic acid for forming a salt with amine is one of benzoic acid, methylbenzoic acid, p-oxybenzoic acid, phthalic acid, benzenetricarboxylic acid, and salicylic acid.

9. A rubber composition as claimed in claim 1, wherein in the aliphatic carboxylic acid amine salts (c-2) having the above formula (IV), the aliphatic carboxylic to form a salt with amine is one of acetic acid, oxalic acid, succinic acid, and adipic acid.

10. A rubber composition as claimed in claim 1, wherein in the phenolamine salts (c-3) having the above formula (V) to form a salt with amine is one of phenol, cresol and resorcin.

11. A rubber composition as claimed in claim 1, wherein in the above amine salts to be used as the vulcanization aid (c), the amine for forming a salt with an aromatic or aliphatic carboxylic acid or a phenol is one of dicyclohexylamine, piperidine, dibutylamine, cyclohexylamine, dipropylamine, and di-tert-butylamine.

12. A rubber composition as claimed in claim 1, wherein the vulcanization aid (c) is benzoic acid piperidine salt.

13. A rubber composition as claimed in claim 1, wherein the vulcanization aid (c) is benzoic acid dicyclohexylamine salt.

14. A rubber composition as claimed in claim 1, wherein the vulcanization aid (c) is benzoic acid dicyclohexylamine salt.

15. A rubber composition as claimed in claim 1, wherein the vulcanization aid (c) is adipic acid piperidine salt.

* * * * *